United States Patent Office 2,736,741
Patented Feb. 28, 1956

2,736,741

ORGANIC REACTIONS INVOLVING ACETALS IN THE PRESENCE OF MIXED ANIONIC CATIONIC ION EXCHANGE RESINS AS CATALYSTS

Claude J. Schmidle, Moorestown, N. J., assignor to Rohm & Haas Company, Philadelphia, Pa., a corporation of Delaware No Drawing. Application September 15, 1951,
Serial No. 246,878

12 Claims. (Cl. 260—465.6)

This invention deals with a process for reacting acetals with compounds yielding an acidic hydrogen and a carbanion, said reaction being effected in the presence of water and of a mixture of a basic anion-exchange resin and an acidic cation exchanger.

If an acetal is mixed in the presence of water with a compound having an acidic hydrogen on a carbon atom, no reaction ensues. Addition of a base to such mixture fails to promote reaction. Likewise, addition of an acid does not promote reaction between acetal and said compound. Yet when to a mixture of an acetal and a said compound in the presence of water there are added both an anion-exchange resin in a basic form and a strongly acidic cation exchanger, reaction takes place under well controlled conditions.

The reaction at least in its early stages may be represented as follows:

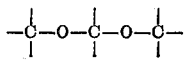

where HZ is the hydrogen-containing compound, a substance capable through loss of a proton of forming a carbanion, the ion thus resulting containing a carbon atom with an unshared electron pair. Sometimes when the radical Z possesses an active hydrogen atom, the hydroxy compound $R^0R'C(OH)Z$ may lose a mole of water to form the unsaturated compound $R^0R'C=Z'$, water thus entering into the initial reaction but being eliminated in the subsequent reaction. Or, the hydroxy compound may add a second mole of HZ to form the compound $R^0R'CZ_2$, a mole of water again being eliminated from the initially formed compound. Here $R^0$ is hydrogen, a hydrocarbon group, including aliphatic, cycloaliphatic, aryl, and aralkyl groups, or a substituted alkyl, aryl, or aralkyl group, R' is hydrogen or an aliphatic hydrocarbon group, and R individually represents an alkyl group, particularly a lower alkyl group of not over four carbon atoms, or the two R groups together represent a saturated divalent group which forms a heterocycle with the oxygen atoms and the central carbon atom.

The characterizing group of the acetals is $>C(OR)_2$ or

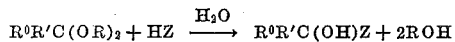

these compounds being diethers in which ether oxygens are separated by a single carbon atom. The acetals may be acyclic or cyclic, saturated or unsaturated. The term acetal as used generically includes the subclasses of formals and ketals, which are characterized respectively by attachment of two hydrogen atoms to the central carbon in the case of the former and of two hydrocarbon groups at carbon atoms thereof to the central carbon atom in the case of the latter. When the central carbon atom carries one hydrogen and a carbon-containing group, the compounds are, of course, derivatives of aldehydes and are conveniently named with reference thereto.

The groups designated R are commonly simple alkyl groups such as methyl, ethyl, propyl, or butyl, although they may be larger groups. When the two R groups form a divalent chain of two or three atoms, the acetal is cyclic, as is obtained from an aldehyde and ethylene or propylene glycol. There is a special case of a cyclic acetal in which the divalent chain contains the

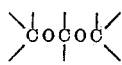

linkage occurring in paraldehyde.

With reference to the parent aldehydes and ketones from which the acetals may be derived, there may be mentioned formaldehyde, acetaldehyde, propionaldehyde, butyraldehyde, isobutyraldehyde, hexaldehyde, heptaldehyde, octaldehyde, dodecaldehyde, 2-ethylhexaldehyde, 3,5,5-trimethylhexaldehyde, crotonaldehyde, β-methylcrotonaldehyde, 2-ethylhexenal, cinnamylaldehyde, benzaldehyde, phenylacetaldehyde, cyclopentanecarboxaldehyde, chloroacetaldehyde, lactic aldehyde, β-hydroxypropionaldehyde, β-cyanopropionaldehyde, β-carboxypropionaldehyde, β-carboxybutyraldehyde, acetone, methyl ethyl ketone, methyl hexyl ketone, dipropyl ketone, vinyl alkyl ketones, methylheptenone, acetophenone, cyclobutyl methyl ketone, mesityl oxide, etc. Aldehydes, R'CHO, in which R' is an alkyl group of not over 11 carbon atoms form one class of particular interest. Formaldehyde, yielding formals, is another starting material of value. Ketones having aliphatic hydrocarbon groups of one to seven carbon atoms form another important subgroup.

As substances containing an acidic hydrogen on carbon with which the acetals are reacted in the presence of the mixture of ion exchangers, there can be used both cyclic and acyclic compounds. The simplest is hydrogen cyanide. The nitroalkanes, exemplified by nitromethane, nitroethane, nitropropane, nitrobutane, and the like compounds having at least one hydrogen on the carbon atom bearing the nitro group form an interesting subclass. Another subclass is comprised of compounds having hydrogen on a carbon in juxtaposition to at least one carbonyl group as in acetoacetic esters, monoalkyl acetoacetic esters, malonic esters, 1,3-diketones, malonamides, cyanoacetates, cyanoacetamides, diacetosuccinates, ketones, and aldehydes. Specific examples of this class, such as ethyl acetoacetate, ethyl cyanoacetate, diethyl malonate, acetone, methyl ethyl ketone, methyl hexyl ketone, acetophenone, diethyl ketone, cyclohexanone, isobutyraldehyde, and the like, are all well known. In another class of reactants methylenic hydrogen is activated by an aromatic ring, as in benzyl cyanide, desoxybenzoin, fluorene, indene, or anthrone. There are other cyclic compounds in which an acidic hydrogen on a carbon atom is found, as in rhodanines, hydantoins, thiohydantoins, pyrazolone, α- and γ-methylpyridines or -quinolines, 2-methylthiazoles. Other reactive compounds are 2,4-dinitrotoluene, trinitrotoluene, chloroform, acetylene, thionaphthenone, barbituric acid, etc.

The above compounds belong to a class which is characterized by the presence of an acidic hydrogen atom on a carbon atom, which hydrogen atom is exchangeable with deuterium under the influence of a basic catalyst. One subclass of these has acidic hydrogen of sufficient activity to be readily replaceable with sodium. This subclass is of considerable interest because of the ease with which the compounds can be reacted under the conditions of the process here disclosed. The subclass can be distinguished by the fact that the compounds thereof have a

group which reacts with an alkali metal alcoholate to replace the indicated hydrogen of said group with an alkali metal.

As a basic anion-exchange resin for use in admixture with a hydrogen exchanger, there may be used either an amino type resin or a quaternary ammonium resin. Typical of the former are insoluble condensates of a phenol, formaldehyde, and an alkylene polyamine, of phenylenediamine and formaldehyde, of melamine and/or urea, formaldehyde, and guanidine, etc. Another effective amino-type exchanger is made by reacting chloromethylated copolymers of styrene and polyvinylbenzene with polyamines, such as diethylenetriamine, triethylenetetramine, or the like. Reaction of the chloromethylated copolymers with tertiary amines, such as trimethylamine, triethylamine, pyridine, benzyldimethylamine, hydroxyethyldimethylamine, or the like, leads to quaternary ammonium salts, which are converted with alkaline solutions to basic forms. Thus a sodium hydroxide solution converts the resin to a quaternary ammonium hydroxide form, while sodium carbonate solution yields an ammonium carbonate resin which is also highly basic. Further details of basic anion exchangers of the latter types are given in applications Serial Nos. 759,308 and 759,309, filed by C. H. McBurney on July 5, 1947, which deal with anion-exchange resins based on copolymers from styrene. These applications matured as U. S. Patents 2,591,573 and 2,591,574, respectively, on April 1, 1952. The various types of anion-exchange resins have been or are available commercially.

Cation exchangers are insoluble substances having sulfonic acid groups. They may be prepared from a natural product, such as coal or lignite, by reaction with a sulfonating agent, including sulfuric acid, sulfur trioxide, or chlorosulfonic acid. They may be made from phenolformaldehyde resins which are sulfonated in the rings or contain omega-sulfonate groups introduced by reaction of formaldehyde and a sulfite. Somewhat related resins are prepared by sulfonating copolymers of styrene and polyvinylbenzene. Typical examples of these various sorts of cation exchangers have been or are on the market. If they are obtained in a salt form, they are readily converted to their hydrogen form upon being treated with a dilute solution of a strong acid, such as hydrochloric acid or sulfuric acid.

The ion-exchange resins as usually prepared are granular, being of a size of 10 to 50 mesh. They may be used in granular form when made into catalyst mixtures for promoting reaction between acetal and acid hydrogen-containing compound. Alternatively, the two types of exchangers can be used in the form of powders.

The ratio of acidic cation exchanger to basic anion exchanger may be widely varied. In many cases a mixture of equivalent amounts of the two types of materials is useful. Yet either exchanger may be used in stoichiometric excess. When the acetal used is one having a low rate of hydrolysis, then it is desirable but not essential to have an excess of the acidic exchanger. Ratios are conveniently varied from 10:1 to 1:10 on a weight basis for acidic cation exchanger to basic anion-exchange resin.

For effecting the reaction of this invention an acetal and the reactant having an acidic hydrogen on a carbon atom are brought together in the presence of water and in the presence of a mixture of strongly acidic cation exchanger and basic anion-exchange resins. The temperature for the reaction will in general lie between 0° and 110° C., preferably 30° to 80° C., and is determined by the ease with which the reaction is brought about. Since in the course of the separate reactions involved there is both an endothermic step and an exothermic step, the over-all reaction does not cause large changes in temperature.

If desired, the reaction of this invention can be carried out in the presence of inert organic solvents, water-miscible alcohols or ethers being often particularly useful for this purpose.

The reaction may be accomplished batchwise or it may be carried out in a continuous manner by passing the reaction mixture over a mixture of exchangers in a jacketed column. Exchangers and reaction mixture are separated. The reaction product is then isolated and, if desired, purified.

There are cases in which the carbanion Z possesses a reactive hydrogen which can combine with the hydroxyl group of the primary reaction product. Water can then be eliminated with formation of an unsaturated compound. This unsaturated compound may be that which is finally isolated. Again a second molecule of HZ may react with the primary reaction product again with elimination of water. An alkylidene compound results.

These reactions may be summarized as follows:

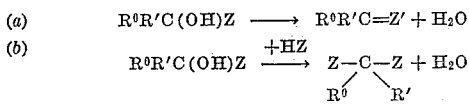

The reacting hydroxyl-containing compound may or may not be capable of isolation in these cases but it is reasonable to believe that it is the primary reaction product and it provides the probable mechanism for formation of final products of the types often obtained.

Typical reactions carried out according to the process of this invention are shown in the following illustrative examples.

*Example 1*

There were mixed equal weights of a basic anion-exchange resin of about 20 to 60 mesh size and of a cation-exchange resin in its hydrogen form. The anion-exchange resin was prepared from a styrene-divinylbenzene copolymer through chloromethylation, reaction of chloromethylated product and polyethylenepolyamine mixture, and activation with a sodium carbonate solution. The cation-exchange resin was a sulfonated phenol-formaldehyde resin in a 40 to 80 mesh size.

There were mixed 20 parts by weight of the above resin mixture and 71 parts of a solution of 26 parts of hydrogen cyanide in 45 parts of water cooled in an ice bath. To the mixture of resins and hydrocyanic acid solution there was slowly added with stirring 102 parts of acetal, $CH_3CH(OC_2H_5)_2$. The resulting reaction mixture was allowed to warm up to about 25° C. The resin mixture was separated by filtration. The filtrate was acidified with 0.05 part of 85% phosphoric acid and distilled. At 85° C./14–15 mm. a fraction of 52 parts of lactronitrile was obtained. It had a refractive index, $n_D^{20}$, of 1.4034. There was no appreciable residue from the distillation.

*Example 2*

There were mixed in the cold 66 parts by weight of paraldehyde, 40 parts of hydrogen cyanide, and 12 parts of a moist granular styrene-divinylbenzene copolymer having quaternary trimethylammoniummethyl hydroxide substituents. There was no indication of any reaction. There was then added a moist granular sulfonated styrene-divinylbenzene copolymer in its hydrogen form. The resulting mixture was stirred for an hour with the temperature thereof rising to 25° C. It was warmed to 35° C. and excess hydrogen cyanide was evaporated. The resins were removed by filtration. The filtrate was acidified with 0.1 part of phosphoric acid and distilled. At 82°–84° C./12–14 mm. there was obtained a fraction of 30 parts of lactronitrile, the refractive index thereof being 1.4030 at 20° C.

*Example 3*

A mixture of 150 parts of acetone, about 32 parts of fine granules of the hydroxide form of a styrene-divinylbenzene copolymer having trimethylammoniummethyl substituents in the rings thereof, about 35 parts of fine granules of acidic sulfonated styrene-divinylbenzene copolymer, 60 parts of water, and 60 parts of the dimethylacetal of 3,5,5-trimethylhexaldehyde was stirred and heated at reflux temperature for four hours. The reaction mixture was filtered. The filtrate formed two layers which were separated. The upper layer was distilled, yielding after removal of excess acetone a fraction of 14 parts of 3,5,5-trimethylhexaldehyde and its dimethylacetal and 30 parts of nonylidene acetone, distilling at 125°–135° C./25 mm.

Other ketones, particularly those having a methyl group next to the carbonyl group, may be reacted in place of acetone.

*Example 4*

A mixture of 40 parts of nitromethane, 59 parts of acetal, 100 parts of water, and 20 parts of each of the two resins used in Example 3 was stirred. The reaction was mildly exothermic, the temperature of the reacting mixture remaining at 30°–31° C. for about an hour. The resin was separated by filtration. The filtrate was acidified with phosphoric acid and distilled. At 95°–98° C./12 mm. there was obtained a fraction of 28 parts of nitropropanol.

Repetition of the above preparation with an equivalent weight of the dipropyl acetal of acetaldehyde leads to the same end product in similar yield within the hour reaction period.

*Example 5*

A mixture of 50 parts of water, 47 parts of nonylaldehyde dimethylacetal, 31 parts of nitromethane, and 20 parts of each of the resins used in the two previous examples was stirred and heated at 70° C. for ten minutes. The reaction mixture was stirred for an additional 24 hours at room temperature. The mixture was filtered to take out the resins. The filtrate was treated with about 0.1 part of ortho-phosphoric acid and distilled. A fraction of eight parts was collected at 114°–116° C./3 mm. It corresponded in composition to nitrodecanol, $C_9H_{19}O.CH_2NO_2$.

In place of nitromethane there may be taken other nitroalkanes so long as they carry a hydrogen on the carbon atom next to the nitro group. Nitroalkanes up to four carbon atoms are particularly useful, but larger nitroalkanes may also be used in the reaction.

*Example 6*

A mixture of 50 parts of water, 75 parts of acetal, 89 parts of 2-nitropropane, and 20 parts of each of the resins used in the example above was stirred for six hours at 25°–30° C., left standing for 16 hours, and stirred for four hours at 20°–25° C. The resin was filtered off and the filtrate was allowed to form layers. The lower layer was acidified with 0.05 part of phosphoric acid and distilled. A fraction of 28 parts was collected at 114°–117° C./40 mm. It corresponded in composition to 3-methyl-3-nitro-2-butanol. The refractive index of the fraction was 1.4464 at 21° C. The value recorded in the literature is 1.4469 at 20° C.

*Example 7*

There were mixed at room temperature 50 parts of water, 90 parts of nitromethane, 76 parts of methylal, and 20 parts of each of the resins of the types used in the previous examples. The mixture was stirred for 18 hours at about 25° C. and at 30°–38° C. for six hours. The resins were separated by filtration and the filtrate was allowed to form layers. From the lower layer there was obtained on distillation one part of 2-nitroethanol, distilling at 100° C./15 mm. From the top layer there was obtained a fraction of eight parts, distilling at 99°–102° C./15 mm. and having a refractive index, $n_D^{23}$, of 1.4330.

*Example 8*

There were mixed with stirring 25 parts of a water-containing cation-exchange resin, prepared by the sulfonation of a styrene-divinylbenzene copolymer, 25 parts of a water-containing quaternary ammonium hydroxide resin, prepared through chloromethylation of styrene-polyvinylbenzene copolymer, amination with trimethylamine, and removal of chloride ion with sodium hydroxide solution, 58 parts of 2-methyl-2-ethyl-1,3-dioxolane, and 18 parts of hydrogen cyanide. To overcome heat of reaction shortly after mixing, cooling was necessary to keep the reaction mixture below 30° C. Stirring was continued for seven hours. The reaction mixture was filtered. The filtrate was treated with 0.05 part of phosphoric acid and was then distilled. The fraction taken at 93°–97° C./23 mm. amounted to 39 parts. It was methyl ethyl ketone cyanohydrin, $CH_3.C_2H_5.C(OH)CN$.

*Example 9*

There were mixed 25 parts of water-containing sulfonated styrene-divinylbenzene resin, 25 parts of the water-containing anion-exchange resin as used in the previous example, 30 parts of diethyl acetal, and 130 parts of ethyl acetoacetate. The mixture was stirred at 25°–30° C. for 24 hours. It was heated to 60° C. and stirred at this temperature for eight hours. The mixture was filtered and the filtrate was distilled. The fraction taken at 130° C./1 mm. amounted to 61 parts and corresponded in composition to ethylidene bis(ethyl acetoacetate).

In place of ethyl acetoacetate there may be used methyl acetoacetate or butyl acetoacetate. Malonate esters of saturated lower aliphatic alcohols of one to four carbon atoms are particularly suitable for the reaction.

*Example 10*

There were mixed 15 parts of each of the two resins used in the previous example, 36 parts of dimethyl acetal, and 160 parts of pentanedione. The mixture was stirred at 25°–30° C. for three hours, left standing for three days, and stirred at 70° C for four hours. The resin was removed by filtration and the filtrate was distilled. At 120°–125° C./1 mm. there were obtained 20 parts of ethylidene bispentanedione,

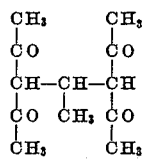

*Example 11*

There were mixed 25 parts of each of the wet resins selected for use in Example 9, 61 parts of nitromethane, and 58 parts of 2-methoxytetrahydropyran. The mixture was stirred at room temperature for 24 hours and filtered. The filtrate was stripped of unreacted material to yield 56 parts of 1-nitromethyl pentamethylene glycol. This was acidified with phosphoric acid and subjected to distillation. A product was obtained with overhead temperatures of 65°–68° C./1.1 mm. which corresponded in composition to 2-nitromethyl tetrahydropyran,

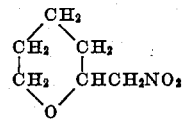

*Example 12*

There were mixed 25 parts of each of the wet resins used in the previous examples, 160 parts of diethyl malonate, and 58 parts of diethyl acetal. This mixture was left standing for 64 hours, heated to 70° C., at which temperature it was stirred for eight hours, cooled to room temperature, and stirred for 16 hours. The mixture was filtered and the filtrate was distilled. The fraction taken at 80°–85° C./1 mm. amounted to 29 parts and was ethylidene bis(ethyl malonate).

In place of diethyl malonate there may be used other malonate esters, particularly those formed with saturated aliphatic monohydric alcohols of one to four carbon atoms.

Example 13

A mixture of 25 parts of each of the resins used in the previous examples, 25 parts of water, 28 parts of 2-methyl-1,3-dioxolane, and 15 parts of hydrogen cyanide was stirred for five hours while the temperature of the mixture was held between 30° and 40° C. by cooling. The mixture was filtered. The filtrate acidified with phosphoric acid and distilled. At 98°–102° C./26 mm. a fraction of 11 parts was obtained, which corresponded in composition to lactonitrile.

Example 14

There were mixed 8.4 parts of a trimethylammonium-methyl substituted styrene-divinylbenzene copolymer in its hydroxyl form, 11.5 parts of a sulfonated styrene-divinylbenzene copolymer in its hydrogen form, these two types of resins being in a granular form of 20 to 50 mesh, 16.1 parts of water, and 88 parts of the dimethylacetal of β-carbethoxypropionaldehyde. The mixture was stirred and cooled to 5° C. and thereto was slowly added 15 parts of hydrogen cyanide. The mixture was stirred for an hour with the temperature kept at about 10° C., was warmed to 25° C. and stirred for 3.5 hours, and was filtered. The filtrate was rendered acidic with phosphoric acid. It was stripped at 30 mm. pressure at room temperature to give a 70% conversion of the cyanohydrin of β-carbethoxypropionaldehyde.

There were mixed 70 parts of this cyanohydrin and 70 parts of acetic anhydride. The mixture was heated under reflux for three hours and left standing without heating for 16 hours. The reaction mixture was treated with 0.1 part of phosphoric acid and acetic acid and acetic anhydride were stripped therefrom by heating. The stripped product was distilled at 110°–112° C./1.7 mm. to give 47 parts of α-acetoxy-γ-carbethoxybutyronitrile.

In the same way the dimethyl acetal of β-cyanopropionaldehyde is reacted with hydrogen cyanide. The product formed is the cyanohydrin of β-cyanopropionaldehyde. Instead of hydrogen cyanide in these preparations there may be used other compounds having an acidic hydrogen on a carbanion, including nitroalkanes, malonates, acetoacetates, cyanoacetates, diketones, ketones, and the like.

The acetals of substituted aliphatic aldehydes comprise an unusually valuable subgroup of reactants with the compounds of the type HZ. Such acetals are obtainable, for example, through the oxo reaction wherein unsaturated ethers, esters, nitriles, and the like compounds are used as starting materials. The direct reaction of carbon monoxide and hydrogen with such compounds as acrylic, methacrylic, or oleic esters or acrylonitrile gives substituted aldehydes. These are best isolated, however, as their acetals, which are readily formed when an alcohol is present during their synthesis. The acetals thus obtained can be directly used for purposes of this invention. Of particular interest in this regard are the acetals of cyanopropionaldehyde, β-cyano-β-methylpropionaldehyde, β-carbalkoxy-β-methylpropionaldehydes, and carbalkoxypropionaldehydes. It will be quite evident that other cyano- and carbalkoxyaldehydes can be used in place of the cyanocarbethoxypropionaldehydes used above by way of illustration.

The reactions may be represented

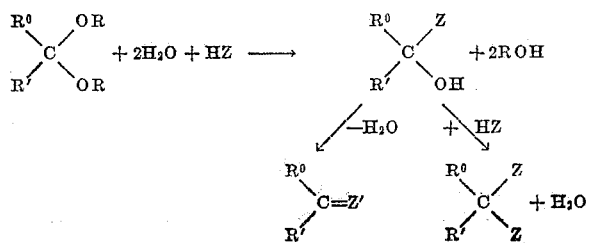

The term Z represents such groups as —C≡N,

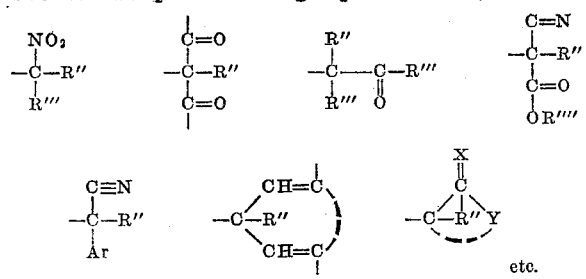

where R" and R'" represent hydrogen or alkyl or aryl groups, R"" represents an alkyl or aryl group, X represents oxygen or sulfur, and Y represents atoms completing a cycle in which N, S, >CO, or >CS, or doubly bonded carbon occurs.

In the above formulas $R^0$ is used to represent hydrogen, aliphatic or cycloaliphatic hydrocarbon groups, aryl groups, aralkyl groups, and substituted groups of these types, R' represents hydrogen or aliphatic hydrocarbon groups, and R represents alkyl groups or cycle-forming substituents. As examples of parent compounds providing such groups in addition to those previously recited there may be mentioned chlorophenyl methyl ketone, alkylphenyl methyl ketones such as methylphenyl or butylphenyl methyl ketones, nitrophenyl methyl ketone, and methylbenzaldehyde which provide aryl groups for $R^0$. Hexahydrobenzaldehyde and related alicyclic compounds provide examples of another type of parent compound.

The acetals generally and broadly have been found to undergo reaction with compounds having an acidic hydrogen attached to a carbanion under the influence of a mixture of basic anion-exchange resins and acidic cation exchangers.

I claim:

1. A process which comprises reacting an acetal and an organic compound having an acidic hydrogen on a carbon atom and yielding a carbanion, which compound contains the group =CH— and is capable of reacting at this group with an alkali metal alcoholate to replace the hydrogen thereof with alkali metal, said reaction being effected in the presence of water and of a mixture of a basic anion-exchange resin and a strongly acidic cation exchanger, and separating an alcohol and the reaction product from said acetal and organic compound, said acetal having the structure $R^0R'C(OR)_2$, where the R's taken individually represent lower alkyl groups and when taken together represent an alkylene group of two to three carbon atoms which together with the oxygen atoms and connecting carbon atom forms a heterocycle, $R^0$ is a member of the class consisting of hydrogen, alkyl groups of not over 11 carbon atoms, and alkenyl groups of two to seven carbon atoms, and R' is a member of the class consisting of hydrogen and alkyl groups of not over seven carbon atoms.

2. A process which comprises reacting an acetal from an aliphatic aldehyde, R'CHO, where R' is an alkyl group of not over 11 carbon atoms, and from an alcohol, ROH, where R is an alkyl group of not over four carbon atoms, and an organic compound having an acidic hydrogen on a carbon atom and yielding a carbanion, which compound contains the group =CH— and is capable of reacting at this group with an alkali metal alcoholate to replace the hydrogen thereof with alkali metal, said reaction being effected in the presence of water and of a mixture of a strongly basic anion-exchange resin and a strongly acidic cation exchanger, and separating a said alcohol and the reaction product of said acetal and organic compound.

3. A process which comprises reacting a formal, $H_2C(OR)_2$, where R is an alkyl group of not over four carbon atoms, and an organic compound having an acidic hydrogen on a carbon atom and yielding a carbanion, which compound contains the group =CH— and is capable of reacting at this group with an alkali metal alcoholate to replace the hydrogen thereof with alkali metal, said reaction being effected in the presence of water and of a mixture of a strongly basic anion-exchange resin and a strongly acidic cation exchanger, and separating an alcohol, ROH, and the reaction product from said formal and organic compound.

4. A process which comprises reacting a ketal, $R^0R'C(OR)_2$, wherein R is an alkyl group of not over four carbon atoms, $R^0$ and $R'$ are aliphatic hydrocarbon groups of not over seven carbon atoms, and an organic compound having an acidic hydrogen on a carbon atom and yielding a carbanion, which compound contains the group =CH— and is capable of reacting at this group with an alkali metal alcoholate to replace the hydrogen thereof with alkali metal, said reaction being effected in the presence of water and of a mixture of a strongly basic anion-exchange resin and a strongly acidic cation exchanger, and separating an alcohol, ROH, and the reaction product from said ketal and organic compound.

5. A process which comprises reacting an acetal, $R^0R'C(OR)_2$, and an organic compound having hydrogen on a methylenic carbon in juxtaposition to at least one carbonyl group, said reaction being effected in the presence of water and of a mixture of a strongly basic anion-exchange resin and a strongly acidic cation exchanger, and separating an alcohol and the reaction product from said acetal and organic compound, in the above formula the R's representing when taken individually lower alkyl groups and when taken together an alkylene group of two to three carbon atoms which together with the oxygen atoms and connecting carbon atom forms a heterocycle, $R^0$ being a member of the class consisting of hydrogen, alkyl groups of not over 11 carbon atoms, and alkenyl groups of two to seven carbon atoms, and $R'$ representing a member of the class consisting of hydrogen and alkyl groups of not over seven carbon atoms.

6. A process which comprises reacting acetal and a nitroalkane having a hydrogen on the carbon atom in juxtaposition to the nitro group, said reaction being effected in the presence of water and of a mixture of a basic anion-exchange resin and a strongly acidic cation exchanger, and separating an alcohol and the reaction product from said acetal and nitroalkane.

7. A process which comprises reacting acetal and hydrogen cyanide in the presence of water and of a mixture of a strongly basic anion exchange resin and a strongly acidic cation exchanger and separating an alcohol and a cyanohydrin.

8. A process which comprises reacting acetal and nitromethane in the presence of water and of a mixture of a basic anion-exchange and a strongly acidic cation exchanger and separating ethyl alcohol and nitropropanol.

9. A process which comprises reacting acetal and diethyl malonate in the presence of water and of a mixture of a strongly basic anion-exchange resin and a strongly acidic cation exchanger and separating ethyl alcohol and ethylidene bis(diethyl malonate).

10. The process of claim 9 in which the anion-exchange resin is one having quaternary ammonium groups attached through methylene groups to the aromatic nuclei of a styrenedivinylbenzene copolymer and the cation exchanger is a sulfonated cation-exchange resin.

11. A process which comprises reacting acetal and ethyl acetoacetate in the presence of water and of a mixture of a strongly basic anion-exchange resin and a strongly acidic cation exchanger and separating ethylidene (bis ethyl acetoacetate).

12. The process of claim 11 in which the anion-exchange resin is one having quaternary ammonium groups attached through methylene groups to the aromatic nuclei of a styrenedivinylbenzene copolymer and the cation exchanger is a sulfonated cation-exchange resin.

References Cited in the file of this patent

UNITED STATES PATENTS

| | | |
|---|---|---|
| 2,398,757 | Loder | Apr. 16, 1946 |
| 2,566,559 | Dolnick et al. | Sept. 4, 1951 |
| 2,579,580 | Howk et al. | Dec. 25, 1951 |

OTHER REFERENCES

Knoevenagel: Annalen, vol. 281, pgs. 94, 95, 104, and 105 (1894).

Decombe: Chem. Abstracts, vol. 27, pgs. 2134–36 (1933).

Gault et al.: Chem. Abstracts, vol. 30, pg. 3412 (1936).

Horning et al.: Chem. Abstracts, vol. 39, pg. 1145 (1945).

Skrabal et al.: Chem. Abstracts, vol. 16, pg. 864 (1922).

Bronsted et al.: Chem. Abstracts, vol. 23, pgs. 2639–40 (1929).

Palomaa et al.: Chem. Abstracts, vol. 28, pg. 2982 (1934).

Leimu et al.: Chem. Abstracts, vol. 42, pg. 3316 (1948).

Fieser and Fieser: "Organic Chem.," pgs. 214–17; 221–222; and 705 (1944).

"Amberlite IRA-400 (OH)," pub. by Rohm & Haas Co., Philadelphia, Pa., pgs. 1–3 (1949).

"Amberlite IRA—410," Laboratory Manual, pub. by Rohm & Haas Co., Philadelphia, Pa., appendix following pg. 6 (March 1950).

"Amberlite IR–120 (H)," pub. ibid., pgs. 1–3 (1950).